United States Patent
Browning

(10) Patent No.: US 6,714,830 B2
(45) Date of Patent: Mar. 30, 2004

(54) PUSH-TYPE SCHEDULING FOR SEMICONDUCTOR FABRICATION

(75) Inventor: Raymond Browning, San Carlos, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/514,864

(22) Filed: Feb. 28, 2000

(65) Prior Publication Data

US 2003/0158618 A1 Aug. 21, 2003

(51) Int. Cl.⁷ .............................................. G06F 19/00
(52) U.S. Cl. ........................ 700/102; 700/100; 700/121
(58) Field of Search .............................. 700/95, 96, 97, 700/99, 100, 101, 102, 121

(56) References Cited

U.S. PATENT DOCUMENTS

| | | | |
|---|---|---|---|
| 4,896,269 A | 1/1990 | Tong ........................... 700/101 |
| 5,170,355 A * | 12/1992 | Hadavi et al. .............. 700/102 |
| 5,212,791 A | 5/1993 | Damian et al. ............... 705/29 |
| 5,255,181 A | 10/1993 | Chapman et al. .............. 705/8 |
| 5,375,061 A * | 12/1994 | Hara et al. ................... 700/101 |
| 5,402,350 A | 3/1995 | Kline .......................... 700/101 |
| 5,432,887 A | 7/1995 | Khaw .......................... 706/19 |
| 5,446,671 A | 8/1995 | Weaver et al. .............. 700/100 |
| 5,493,501 A * | 2/1996 | Kondo .......................... 700/95 |
| 5,495,417 A | 2/1996 | Fuduka et al. .............. 700/121 |
| 5,544,350 A | 8/1996 | Hung et al. ..................... 716/19 |
| 5,546,326 A | 8/1996 | Tai et al. ....................... 702/84 |
| 5,612,886 A | 3/1997 | Weng .......................... 700/101 |
| 5,694,325 A | 12/1997 | Fukuda et al. .............. 700/121 |
| 5,706,200 A | 1/1998 | Kumar et al. ................. 700/100 |
| 5,748,478 A | 5/1998 | Pan et al. ...................... 700/99 |
| 5,751,580 A | 5/1998 | Chi ............................. 700/101 |
| 5,778,386 A | 7/1998 | Lin et al. ....................... 707/10 |
| 5,787,000 A * | 7/1998 | Lilly et al. .................... 700/95 |
| 5,818,716 A | 10/1998 | Chin et al. ................... 700/100 |
| 5,826,238 A * | 10/1998 | Chen et al. ...................... 705/8 |
| 5,838,565 A | 11/1998 | Hsieh et al. .................... 700/11 |
| 5,880,960 A | 3/1999 | Lin et al. ....................... 700/99 |
| 5,889,673 A | 3/1999 | Pan et al. ...................... 700/97 |
| 5,950,170 A | 9/1999 | Pan et al. ........................ 705/7 |
| 5,953,711 A | 9/1999 | Ishikuza ...................... 705/400 |
| 6,243,612 B1 * | 6/2001 | Rippenhagen et al. ...... 700/100 |
| 6,360,133 B1 * | 3/2002 | Campbell et al. ........... 700/115 |
| 6,591,153 B2 * | 7/2003 | Crampton et al. .......... 700/103 |
| 6,636,599 B1 * | 10/2003 | Mullen ................... 379/265.05 |

OTHER PUBLICATIONS

"FAB 300" <http://www.consilium.com/products/fab300_page.htm>, visited Apr. 2, 1999. (4 pages).
"FAB 300" <http://www.consilium.com/products/fab300_page.htm>, visited Jun. 4, 1999. (4 pages).
Xiuli Chao, et al., "Queueing Networks: Customers, Signals and Product Form Solutions", pp. 219–221, 1999, Wiley.

* cited by examiner

*Primary Examiner*—Leo Picard
*Assistant Examiner*—Paul Rodriguez
(74) *Attorney, Agent, or Firm*—Fitzpatrick, Cella, Harper & Scinto

(57) ABSTRACT

Control for a production line that queues work-in-process (WIP) prior to a re-entrant bottleneck processing node, such as a photolithography device in a semi-conductor fabrication line. For each WIP, a determination is made as to whether a cleared trajectory is available through all processing nodes subsequent to the bottleneck processing node and back to the re-entrant node or to exit of the production line. If a cleared trajectory is available, the subsequent processing nodes are reserved for the WIP. The WIP is then injected into the process flow, with the result that secondary bottlenecks at downstream processing nodes are largely avoided because the nodes have been pre-reserved. If a cleared trajectory for more than one WIP is available, selection of one WIP for injection into the workflow can be made based on a queuing or priority based selection process.

32 Claims, 7 Drawing Sheets

PUSH-TYPE SCHEDULING FOR SEMICONDUCTOR FABRICATION

BACKGROUND OF THE INVENTION

1. Field of the Invention

The present invention relates to control of a production line for semiconductor fabrication. More particularly, the present invention concerns control for a semiconductor production line that queues work-in-process (WIP) before a re-entrant bottleneck processing node (such as a photo-lithographer), with the control utilizing a push-type method for sending WIP to subsequent processing nodes for processing after a determination has been made that a cleared trajectory through all subsequent processing nodes back to the re-entrant process is available and after the subsequent processing nodes have been reserved for the trajectory.

2. Description of the Related Art

Semiconductor fabrication is generally performed in a re-entrant production line consisting of a network of processing nodes. The production line is re-entrant in that a single WIP is processed multiple times by at least one of the processing nodes, usually a photolithography node. Due to a lack of control over WIP entering a queue for the re-entrant node, the re-entrant node often becomes a bottleneck in the processing network. The bottleneck results in inefficiencies in the production line utilization; inefficiencies that result in increased cost of both ownership and operation of the production line.

Additionally, subsequent processing nodes following the photolithography node can decrease the efficiency of the production line. These subsequent processing nodes perform manufacturing functions such as implantation, etching, metrology, oxidation, and so forth. Given the small amount of control over the actual WIP and these subsequent processing nodes, secondary bottlenecks can form in the production line leading to further inefficiencies. In addition, re-tooling and setup times of the various process machinery at the nodes can further increase the inefficiency.

These inefficiencies increase the cost of ownership and operation of the entire network. Therefore, maximizing the utilization of the bottleneck process, as well as reducing secondary bottlenecks, would improve the throughput of the network as a whole and minimize the cost of ownership.

Unfortunately, developing an optimal schedule for such a production facility can be very complex due to the number of steps involved and the possible combinations of those steps. Due to the complex computations involved in developing a schedule, real-time adjustments to the schedule can be very difficult.

Some effort has been made to resolve this problem and to increase the throughput of the production line. For example, U.S. Pat. No. 5,889,673, entitled "Manufacturing Method And System For Dynamic Dispatching Of Integrated Circuit Wafer Lots", utilizes a method for dynamic dispatching of integrated circuit wafer lots (product). According to the patent, loading factors of machines downstream of the lithography machine, or descendent machines, are calculated to determine the machine with the lowest estimated loading value. That machine is then given the highest priority and the wafer lots are dispatched to that machine after the lithography process.

Therefore, the method of U.S. Pat. No. 5,889,673 addresses selection of which machine the product is sent to after the lithography process, in order to ensure that each downstream machine is adequately loaded. However, this method does not guarantee that the product will be processed by each downstream machine immediately upon the product arriving at the machine. As a result, secondary bottlenecks are still likely to occur.

Another attempt to reduce secondary bottlenecks is described in U.S. Pat. No. 5,446,671, entitled "Look-Ahead Method For Maintaining Optimum Queued Quantities Of In-Process Parts At A Manufacturing Bottleneck". According to the patent, a look-ahead method monitors the product queued in all potential bottleneck processing nodes in the factory. A flag status is set at the queue of each potential bottleneck process to prevent product from being started until the queue at the bottleneck process has declined to a sufficiently low point as determined by factory management personnel. Thus product pile-up at the bottleneck queues is reduced.

However, like U.S. Pat. No. 5,889,673, the method of U.S. Pat. No. 5,446,671 also does not guarantee that the product will be processed through all processing nodes immediately upon receipt of the product at the node. Thus, with this method a secondary bottleneck is still present with the amount of product in the bottleneck queue having merely been reduced.

The importance of addressing bottleneck queues is particularly illustrated in the process of manufacturing semiconductors. Generally, in a semiconductor manufacturing facility, a semiconductor is produced by an initial product, such as a single wafer, being processed through a series of processing nodes to form a finished product. Each processing node in the series generally performs a different processing task. For example, the manufacturing facility may contain a series of processing nodes where each node is respectively dedicated to performing lithography, implantation, etching, metrology, or oxidation. The processing through each process may be linear with any particular process or processing node being visited only once. Alternatively, there may be a series of loops where a wafer is routed through the same processing node multiple times. The linear model is typical of a manufacturing production line where processing nodes or processes are set out in a definite order, while the loop model is typical of a production line where processing nodes are used as needed, depending upon the product. In the latter case, the product being processed may be re-entrant into the conceptual production line if one machine is used more than once.

In the present invention, one possible production method concerns a general network of processing nodes with no restrictions on the order of processing or the number of processes needed to finish a job. Also, no restriction is placed on the number or type of entry or exit nodes in the network. In a limiting case, a route through an isolated network of n nodes is equivalent to routes covering a complete directed graph (digraph) of N vertices and N(N−1) edges. A dynamic path through multiple nodes from one defined node to another defined node is referred to as a trajectory $T(j,t_j)$, where j is an ordered set of nodes and $t_j$ is a set of arrival times.

In a series of processing nodes, at least one type of processing node will generally be a bottleneck. The bottleneck may exist for a variety of reasons. For example, the length of a task being performed at the node may be longer than other processes or the node may be revisited multiple times. Also the cost of the bottleneck processor and/or the cost of operating the bottleneck processor may be very expensive, thereby limiting the number of those processors that may be employed in the network. Therefore, the cost of operating the processing network could be somewhat minimized by maximizing utilization of the bottleneck process. That is, improving the throughput of the bottleneck process would improve the throughput of the network as a whole, thereby reducing the cost of ownership of the entire network. However, improving the throughput of the bottleneck process alone may not lower the cost of ownership of the entire network where, for example, there is extreme under-utilization of less expensive processors.

Many manufacturing networks are finite source queuing networks where jobs are added to the system by considering the maximum number of jobs in the system. A description of finite source queuing networks can be found in Xiuli Chao, et al., "Queuing Networks: Customers, Signals and Product Form Solutions", pp. 219–221, 1999, Wiley. Under these circumstances, the arrival rate may be defined as:

$$\lambda(n)=0 \text{ for } n \geq M \tag{1}$$

$\lambda(n)$ is positive and finite for $n \leq M-1$, where M is a positive integer. In this case, M is the number of jobs the system can hold.

The stationary distribution of the system, or the average number of jobs in the system, is determined by the marginal distribution of the stationary distributions at the nodes of the system.

$$\pi(\bar{n}) = c \prod_{j=0}^{N} \pi_j(n_j) \text{ for } \sum_{j=0}^{N} n_j = M \tag{2}$$

One may expect that the stationary distribution at each node of a system having multiple processing nodes will be approximately Poisson in form, and thus, the joint distribution of all of the processing nodes will also be Poisson in form. Assuming that the balance rate equations hold in an operational system, and thus the throughput of an individual node is equal to the arrival rate, the throughput of the individual nodes can be related to the queue length or the number of jobs. Assuming a Poisson distribution for the arrival rate, a utilization factor, $\rho_j$ for any node j, can be related to the average number of jobs, $n_j$, at the node by the formula, $$\rho_j = \frac{n_j}{(n_j + 1)} \tag{3}$$

Where an average utilization of 66% is desired for each node, the average number of jobs at each node must be 2. Therefore, for the total average utilization of the network to be 66%, from equation (2), the network needs an average of 2n jobs. However, since arrival at each node is a Poisson process, a buffer must be available at each node. For example, if on average there are two jobs at each node, for one-eighth of the time, there will be a queue with four jobs waiting to be processed at any node and there is a 1:100 chance that 10 jobs will be queued.

Buffering in a product queue is an important part of managing the network. Buffering can be achieved either by a central buffer, that is after processing, the jobs can be returned to one buffer, or the buffering can be spread amongst the various processing nodes, depending on the actual probability of them being used. The details of the distribution of buffers depends on the mix of process times and schedules of the job processing. The buffering discipline chosen will also take into account the difficulty and time constraints of moving the processed jobs. For both the linear model and the re-entrant model, this distribution of buffering and scheduling of delivery of product to a processing node can be a complex problem and can add significantly to processing times and labor costs.

The above utilization calculation of the processing nodes assumes that there is no setup time for the job on the processing equipment. That is, the process node, when idle, is able to instantly begin processing upon arrival of a job. If this condition is not true, then the utilization of the equipment drops. This is true even if setup time can be done concurrently with the processing of a previous job. In this case, utilization falls rapidly unless the average number of waiting jobs is increased. If the setup time is similar to the process time, then the node must have, on average, four jobs, one running and one being concurrently set up, in order to achieve 60–70% utilization. Thus, even a network with concurrent setup time increases both the work in process and the buffering problem. There are no general solutions for these problems, and specific solutions are computationally intensive and do not have a built in cost of ownership factor.

Therefore, the buffering (or queuing) at the bottleneck process is one determining process for both the throughput of the network and the capacity of the system. Accordingly, improving this process would facilitate a lowered cost of ownership of the network.

SUMMARY OF THE INVENTION

The present invention addresses the foregoing by providing control over a production line that queues work-in-process (WIP) before a re-entrant bottleneck processing node. The invention utilizes a push-type method for sending WIP from the bottleneck process to subsequent processing nodes, after confirming that a cleared trajectory exists through all processing nodes back to the re-entrant processing node or out to exit, and after reserving the cleared trajectory for the WIP in question.

In one aspect, the invention may be embodied in the context of a production line such as a semiconductor production line, where product such as a single wafer or a cassette of wafers, are queued in a pre-lithography queue awaiting processing. In order to provide for more efficient utilization of the production line, flow of product through the production line is controlled by determining that a cleared trajectory through all processing nodes subsequent to the bottleneck processing node (lithography) is available. Once a cleared trajectory has been found, the subsequent processing nodes are reserved for the cleared trajectory and the WIP in question. A WIP is then selected from the re-entrant queue for the trajectory and then the trajectory is initiated. The trajectory preferably includes either a trajectory back to the queue or to an exit of the production line.

As a result of the foregoing, WIP selected for the trajectory is processed through each processing node in the production line upon receipt of the product by each node. Therefore, secondary bottlenecks are largely avoided because the product processing has been pre-reserved at each node and there is ordinarily no need for product to wait for the node to become available. Accordingly, the invention provides for more efficient utilization of the production line and a reduction in secondary bottlenecks.

In further aspects of the invention, where multiple WIP's qualify for initiation of their respective trajectories, one WIP is selected over the others based on a queuing discipline, such as priority of jobs.

The invention may be embodied in the foregoing method or apparatus. An apparatus according to the invention controls a production line that queues WIP prior to a re-entrant bottleneck process. The apparatus may comprise a memory for storing executable process steps, and a processor for executing the executable process steps, wherein the executable process steps comprise a cleared trajectory determination and processing node reservation for the trajectory corresponding substantially to the foregoing method.

Further embodiments of the invention include computer-executable process steps or a computer-readable medium on which is stored code for performing the computer-executable process steps, wherein the process steps comprise a cleared trajectory determination and processing node reservation corresponding substantially to the aforementioned method.

In yet another aspect, the present invention may be a method to schedule a process job consisting of multiple processing steps through a network of multiple processing nodes. Prior to describing the method, a bottleneck processing node must be defined and a product buffer must be available at the bottleneck node. Therefore, defining a node or node type that is the main bottleneck process or a process used for setting up the bottleneck process in a multi-node processing network is first accomplished. Once the bottleneck node is defined, a product buffer is arranged on the bottleneck node for containing a queue.

To begin the method, a product is selected from the queue to be processed. The product may be selected based on some queuing discipline such as priority of jobs in the queue. However, before processing of the product by the bottleneck process begins, a determination is made whether there is a cleared trajectory through all processing nodes subsequent to the bottleneck node that are necessary for processing the product. The trajectory may be either to the next bottleneck processing node buffer, or to an exit of the network. Once a cleared trajectory is found, the subsequent processing nodes are reserved for the trajectory. The trajectory may be either reserved for immediate initiation, or reserved in time. After the subsequent processing nodes have been reserved, the trajectory is initiated and processing of the selected product by the bottleneck process begins. Finally, the product is either returned to the bottleneck processing node queue or to an exit of the network, depending on the state of processing for the product.

Two concepts of the invention become apparent from the foregoing method. First, a guaranteed path to either return to the bottleneck buffer or to an exit of the network is reserved. Second, a more optimal loading of the bottleneck process results. In guaranteeing a path to the pre-bottleneck buffer, the method ensures that the bottleneck processes are kept well loaded for any total loading of the network. Ensuring the bottleneck process is well loaded ensures that the network is operating at more efficient speed for any combination of processors.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENT

Figure 1A:
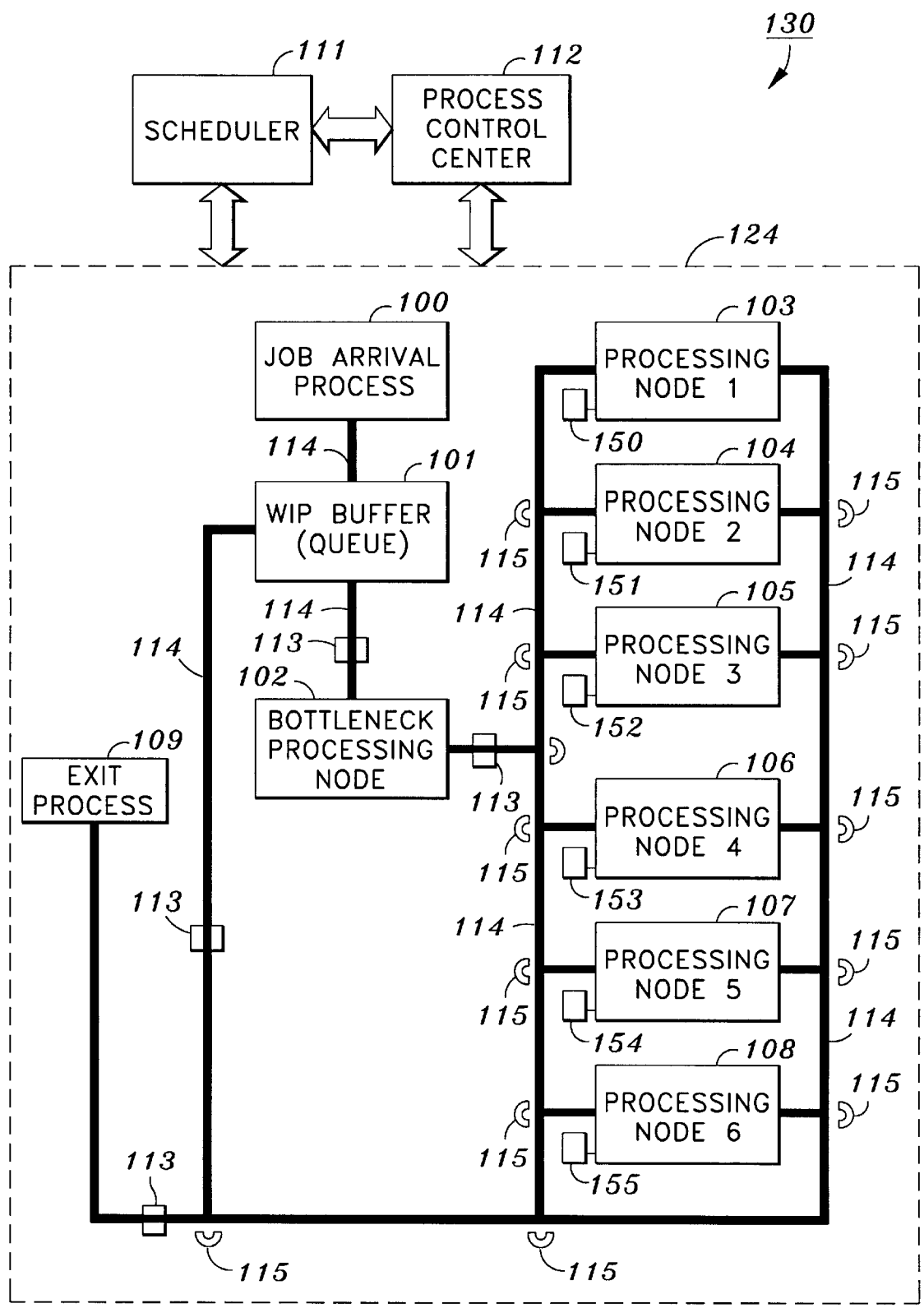
FIG. 1A depicts a multi-node processing network according to the invention.

FIG. 1A depicts a multi-node processing network 130 according to the present invention. As shown in FIG. 1A, the network may include a network of processing equipment 124 that communicates with a scheduler 111 and a process control center 112. Scheduler 111 will be described in detail below but to summarize, scheduler 111 may be computer executable process steps contained in a computer to schedule the flow of product through network 124. Process control center 112 is preferably a computing system that includes a software application program for controlling the flow of product through a manufacturing production facility. The application program preferably controls the flow of product from one processing node to the next within network 124 utilizing feedback provided by various computers and sensors within network 124. In this regard, network 124 may contain sensors (not shown) to indicate the location of product within network 124 at any given time.

Additionally, each processing node in the network, such as processing nodes 102 through 108, may be provided with a computer system to control the processing node. In FIG. 1A, reference numbers 150 through 155 represent computing systems that control each of processing nodes 103 through 108 respectively. Each of the computing systems 150 through 155 provide feedback to process control center 112 that, as will be described in more detail below, is utilized by process control center 112 to control the flow of product through network 124.

As seen in FIG. 1A, processing network 124 may include job arrival process 100, WIP buffer (queue) 101, and multiple processing nodes 102 through 108. At least one of the processing nodes is a bottleneck processing node 102. Job arrival process 100 is preferably any process that controls the flow of new product into the network. In this regard, one important function of job arrival process 100 is to feed new product that is to be processed through the network to WIP buffer (queue) 101. A more detailed description of the process by which new product is fed into the network will be described below. Job arrival process 100 is preferably automated where a computer controls the flow of new product from job arrival process 100 into WIP buffer (queue) 101. However, a manual process may also be employed. For instance, job arrival process 100 may be a machine that requires an operator to initiate passing of new product. For example, job arrival process 100 may provide a visual indication to the operator that new product is to be loaded from job arrival process 100 to WIP buffer (queue) 101. Upon receiving the indication, the operator may then load the required new product into WIP buffer (queue) 101 by, for example, pressing a button that allows the new product to pass.

Job arrival process 100 also preferably receives feedback from WIP buffer (queue) 101. In this regard, job arrival process 100 and WIP buffer (queue) 101 preferably communicate with one another, either directly or through a central processing station such as process control center 112. The feedback may include various factors, such as a fixed number of WIP contained in WIP buffer 101. Utilizing the feedback, a determination is made whether job arrival process 100 is to release new product to WIP buffer (queue) 101. For example, WIP buffer (queue) 101 may be set with a fixed limit of fifty product. When the number of product contained in WIP buffer (queue) 101 falls below fifty, job arrival process 100 may then release new product to WIP buffer (queue) 101.

The release of new product may be controlled in any one of several ways. For instance, job arrival process 100 may hold all jobs until receiving an indication that the number of product in WIP buffer (queue) 101 is less than a threshold level, such as fifty. In this case, WIP buffer (queue) 101 would provide feedback on the number of product either directly to job arrival process 100 or to the central processing station that would then pass the information on to job arrival process 100. Alternatively, job arrival process 100 may perform periodic queries of WIP buffer 101 to determine whether the number of product has fallen below fifty. Regardless of the method, the flow of new product into WIP buffer (queue) 101 is performed through job arrival process 100.

Once product has been supplied from job arrival process 100 to WIP buffer (queue) 101, one of the product in the WIP buffer (queue) 101 is selected for processing. The details of the selection process and initiation of the selected product for processing will be discussed in more detail below.

As shown in FIG. 1A, the network may contain processing nodes 102 through 108. In a semiconductor processing network, these nodes may include lithography, implantation, etching, metrology, and oxidation. However, not every node is ordinarily utilized in any one pass of a product through the network back to the WIP buffer (queue). This may be the case where, for example, processing nodes 103 and 104 are duplicate nodes that each perform the same processing function. In such a case, either processing node 103 or processing node 104 could be utilized in processing of a product. Therefore, in FIG. 1A, a selected product may be processed by processing nodes 102, 103 and 106 before either returning to WIP buffer (queue) 101 for additional processing, or to exit process 109.

Also shown in the network of FIG. 1A are conveyors 114 for transporting product from one processing node to another, thus forming a production line. It should be noted however, that conveyors are not the only means by which product can be transported from one node to another. In this regard, if the physical distance from one processing node to another would prohibit the use of a conveyor, the product may have to be manually transported from one node to the next. This may be the case where, for example, one processing node may be located in a different building. In this case, an operator, such as a parts mover or an expediter, may transport the product from one building to another. In such a case, once the product has been received at the next processing node, an operator would most likely have to manually load the product into the processing node to begin processing.

Although FIG. 1A shows the conveyor 114 flowing directly into each processing node, this depiction is merely for simplicity. In reality, when the processing of a product has been completed at one processing node, the product moves on to the next processing node required for processing the product. However, the product does not necessarily flow directly into the processing node where processing commences immediately. Rather, before product is processed by a node, it usually must be setup in the node. Generally, this may require an operator to manually place the product into a jig or holding tool in order for the product to be processed. Additionally, the operator may have to setup the processing node by zeroing out any previous settings and entering new settings. However, for simplicity, FIG. 1A assumes that product flowing into each of the processing nodes is automatically setup and that any holding stations are included within the general depiction of each processing node.

One example of a setup process may be a coat/develop track mechanism (not shown) at bottleneck processing node 102. In FIG. 1A, a coat/develop track mechanism is included in the general depiction of bottleneck processing node 102. When a wafer is first sent from WIP buffer 101 to bottleneck processing node 102, it first enters a coat/develop track mechanism where the wafer is coated with a resist before being exposed in the lithography process. After being exposed in the lithography process, the wafer then re-enters the coat/develop track mechanism to develop the exposed resist. Therefore, the product does not flow directly into the lithography process, but first passes through a setup process.

The network of FIG. 1A may also include product tracking mechanisms 113 and product flow gates 115. In this regard, product tracking mechanisms 113 may track the flow of product through the network and provide feedback to process control center 112. In this way, process control center 112 can maintain a continuous status of the product. Additionally, process control center 112 can utilize the tracking information for operating product flow gates 115. In this regard, based on feedback from the tracking mechanisms, process control center 112 can automatically control flow gates 115 to direct the product through the network.

As can readily be seen in FIG. 1A, process control center 112 can control the flow of product through any of processing nodes 102 through 108 in virtually any order. The flow of the product may be, for example from bottleneck processing node 102 to processing node 103, then to processing node 106, and then return to node 103 (if necessary) for further processing and finally either to exit the network or to return for another lithography process. Thus, FIG. 1C shows one possible path for a product as indicated by the double line arrows connecting the various processing nodes.

Figure 1B:
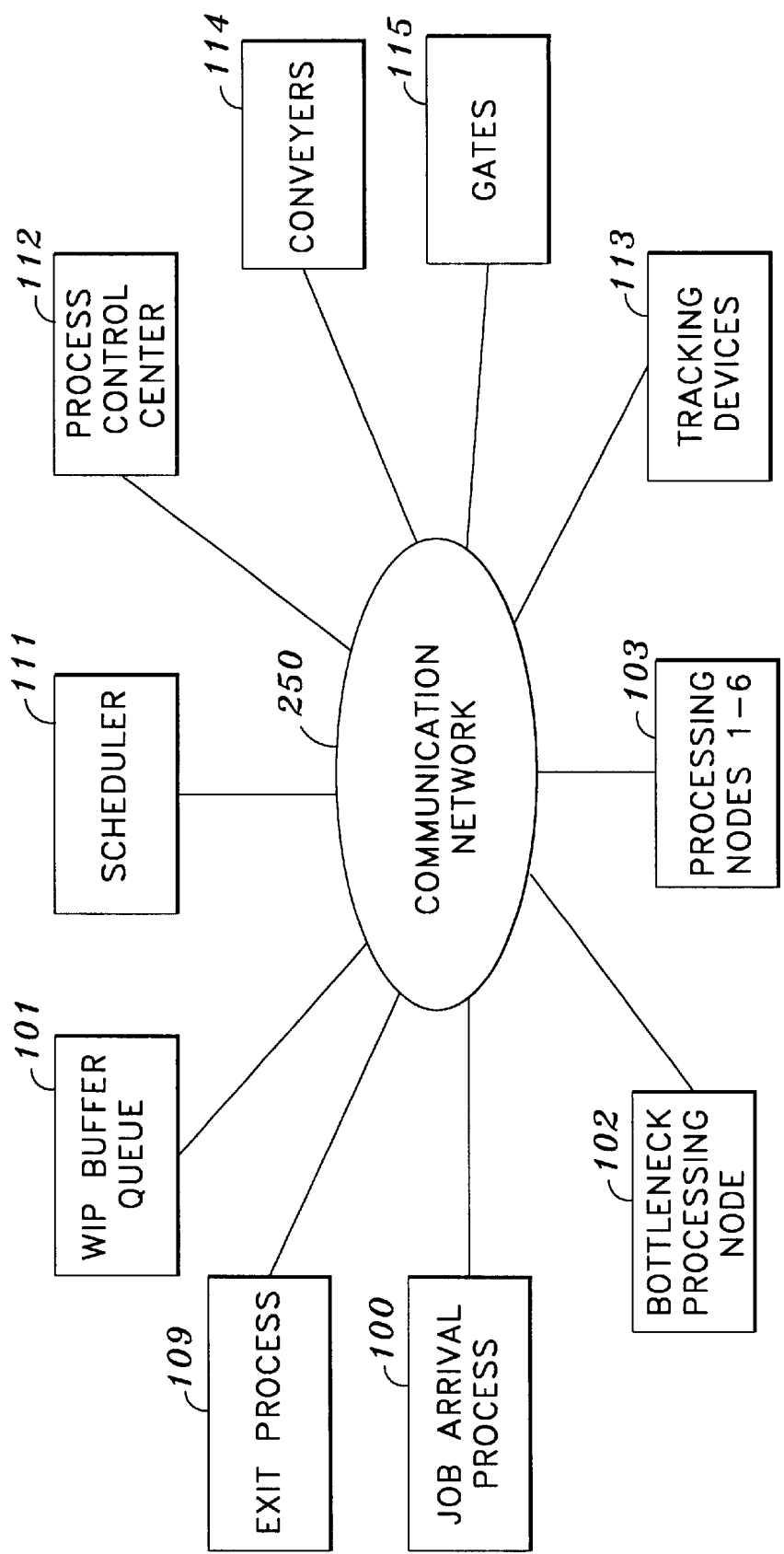
FIG. 1B is a diagram depicting communication between components of the processing network of FIG. 1A.
Figure 1C:
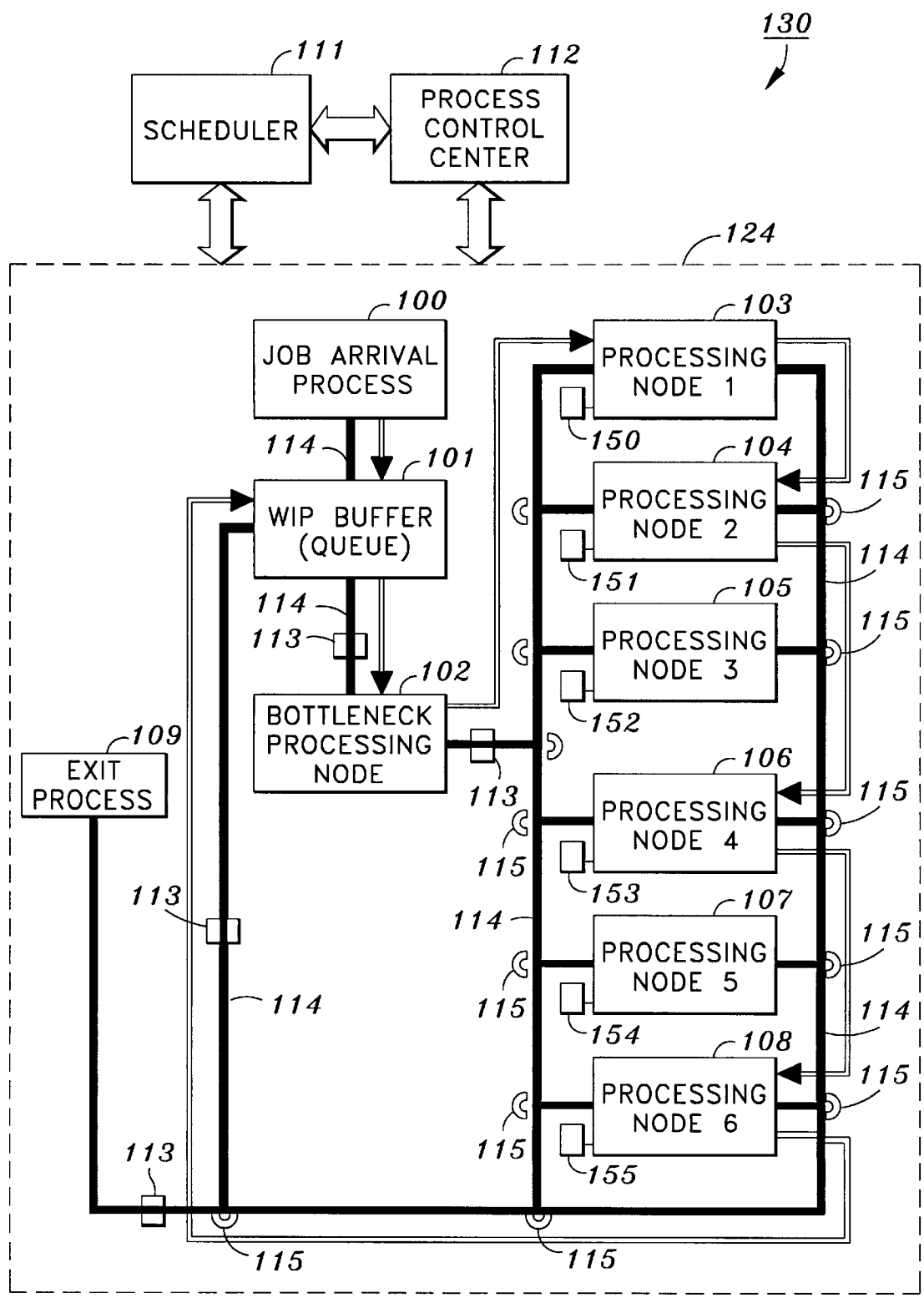
FIG. 1C depicts one possible processing path of a product through the network of FIG. 1A.

As shown in FIG. 1C, product may flow from job arrival process 100 through WIP buffer (queue) 101, bottleneck processing node 102, processing node 103, processing node 104, processing node 106, processing node 108, and return to WIP buffer 101. A more detailed discussion of the control of the network and the flow depicted in FIG. 1C is provided for below.

In order to control the network, communication between at least some components of the network is needed. FIG. 1B depicts a diagram showing an arrangement that allows each of the component parts of the network to communicate through a communication network 250. Communication network 250 may be, for example, a local area network (LAN). In such a system, each of the processing nodes may include a computer for controlling operations of each processing node, such as computers 150 through 155 shown in FIG. 1A. In this way, each processing node may be programmed individually to operate by a numerical control process. Thus, by communicating with process control center 112, the computers controlling the processing nodes can provide a status indication of the processing node, i.e. whether the processing node is busy with a job, whether it is available for processing, or if it is currently busy, when it will become available.

Additionally, conveyors 114, product flow gates 115, tracking devices 113 are connected to the network to communicate with process control center 112. By communicating with process control center 112, these mechanisms may be automatically operated by process control center 112. Thus, with all of the processing equipment in the processing network connected to a communication network, the flow of product is automatically controlled.

Although FIG. 1B depicts the various processing equipment connected to a communication network such as a LAN, other forms of communication may also be employed. For example, a processing node may provide a visual indication that processing of the product in that node has been completed. The visual indication may be, for example, a flag or an electronic indicator, such as a light or buzzer, that would be provided to an operator. Upon receiving the indication, the operator may then manually remove the product from the processing setup, place it on a conveyor and manually press a switch to operate the conveyor to send the product to the next processing node. Therefore, although the network would most likely be more efficient if it were completely automated, at least some manual operation may be required and the present invention may also be employed in such a system.

Figure 2:
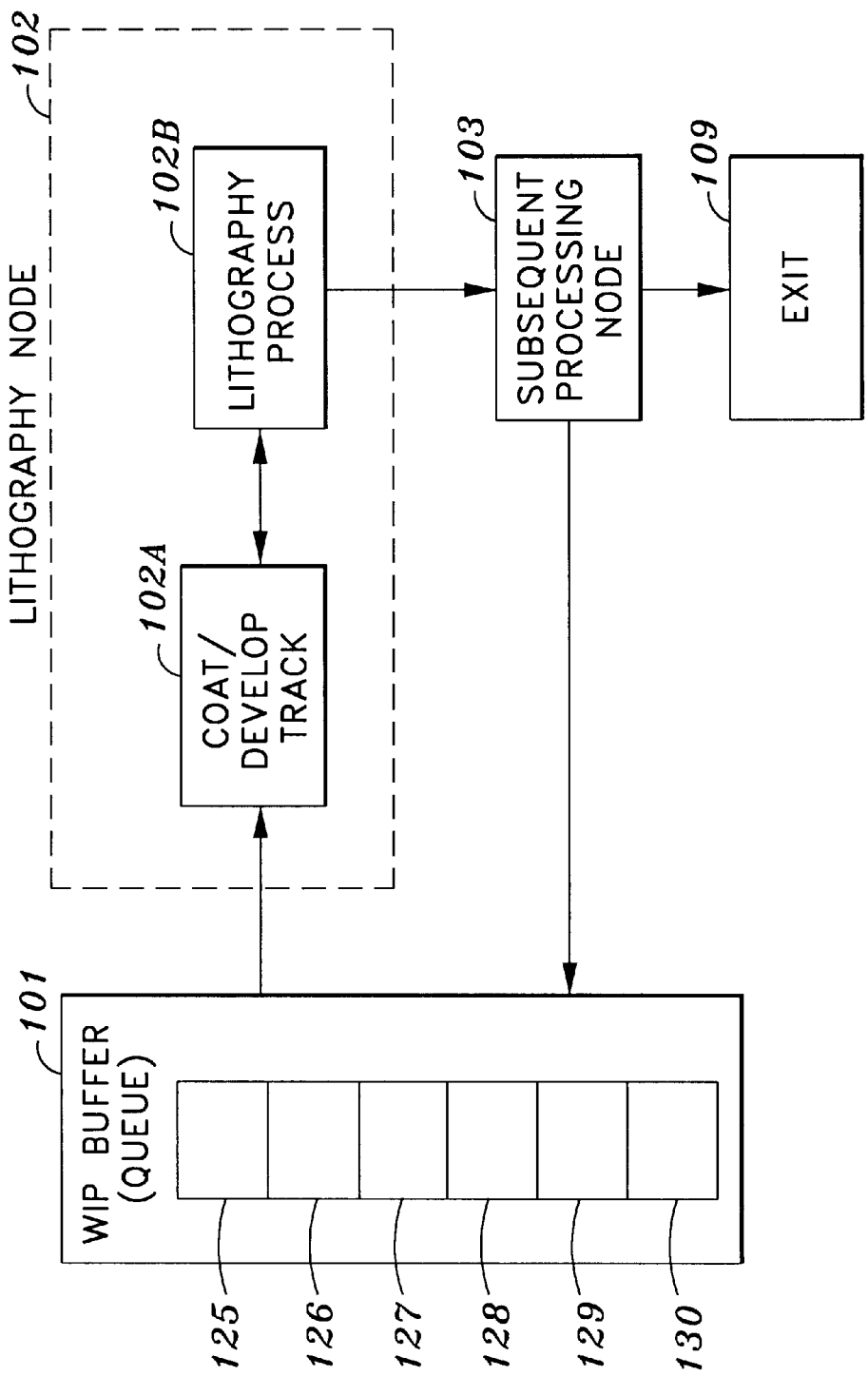
FIG. 2 depicts one example of product flow through a processing network according to the invention.

FIG. 2 depicts an example of the flow of product through a semiconductor processing network. As shown in FIG. 2, product is contained in a WIP buffer (queue) 101 before a lithography node 102. In FIG. 2, reference numerals 125 through 130 represent cassettes of unprocessed wafers. However, the queue may also contain individual wafers rather than wafers in a cassette. The wafers first pass from WIP buffer (queue) 101 to lithography node 102. However, the wafer may not immediately enter the lithography process. Rather, a holding bin may be present at the lithography node to receive the wafers. This may be the case where manual setup by an operator is required. In such a case, an operator would move a wafer from the holding bin and perform setup of the wafer for processing.

Before entering lithography process 102B, the product (wafers) pass through coat/develop track mechanism 102A. In coat/develop track mechanism 102 A, the wafer is coated with resist. After being coated with the resist, the wafer then enters lithography process 102B for exposure. After exposure in the lithography process, the wafer returns to coat/develop track mechanism 102A for developing.

Upon completion of the lithography process in lithography node 102, the wafer then passes to any subsequent processing node(s) 103 required in the current processing pass through the network. In this regard, the wafer may be processed by processing nodes to perform implantation, metrology, oxidation and/or etching. Therefore, although FIG. 2 shows only a single subsequent (i.e., downstream) processing node 103, the actual processing may be performed by multiple processing nodes. Similar to the lithography node, these subsequent nodes may also have holding bins for containing product as it is received at the node if manual operator setup is required.

After any subsequent processes have been completed, the product (wafer) then either returns to the WIP buffer (queue) 101 or to exit 109. Utilizing the tracked status described above, scheduler 111 determines whether the product is to return to WIP buffer (queue) 101 or to exit 109, depending upon whether the wafer requires additional lithography and/or subsequent processing or whether processing of the wafer is complete.

Figure 3:
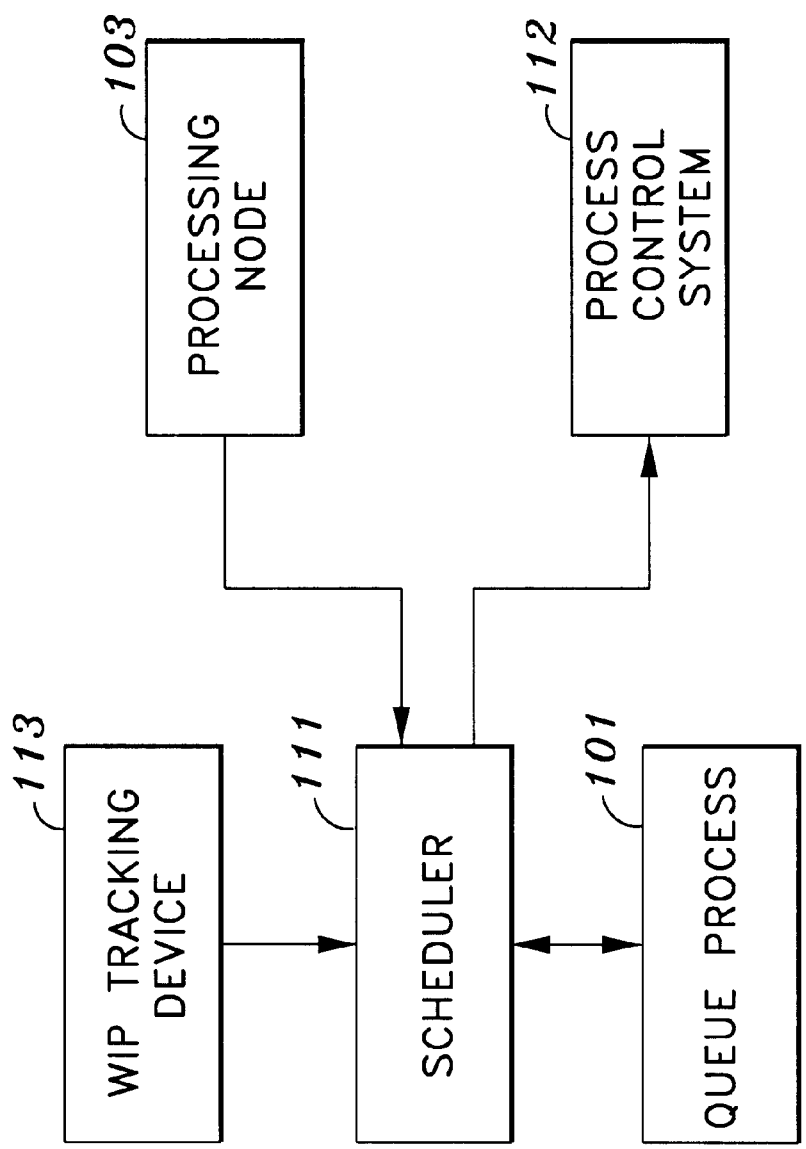
FIG. 3 illustrates communication between various portions of a processing network according to the invention.

FIG. 3 depicts one possible system for communication between various components that control a production line according to the present invention. In FIG. 3, a scheduler 111 is utilized to control the flow of product in the network. Scheduler 111 may be computer-executable process steps embodied in a computer program, an electronic device, or any means where decisions taken about the availability of equipment, product to be processed and product priority can be processed. As seen in FIG. 3, a WIP tracking device 113 communicates with scheduler 111. As previously discussed, the communication may be through a local area network, direct communication such as via a wire or wireless communication, or any other means of communication. As discussed with regard to FIG. 2, WIP tracking device 113 and scheduler 111 communicate for WIP tracking device 113 to provide identification information of each product to the scheduler 111. The scheduler then utilizes this information to determine the priority of the product.

Also communicating with scheduler 111 is queue process 101. Queue process 101 contains product awaiting processing through the network. Queue process 101 provides information to scheduler 111 about the number of product contained in the queue, the identification of which product are in the queue and other information about the product in the queue. Scheduler 111 utilizes this information to determine a priority of product in the queue and to provide an indication to the queue that new product is to be loaded, for example from job arrival process 100 into WIP buffer (queue) 101. Scheduler 111 also provides information to queue process 101 about which product in the queue is to be released from the queue and sent to the lithography process. In this manner, scheduler 111 and queue process 101 communicate to control the flow of product into and out of the queue.

Also shown in FIG. 3 is communication between process node 103 and scheduler 111. In this regard, FIG. 3 depicts a single process node communicating with scheduler 111 for simplicity. However, in actuality, all processing nodes in the network would communicate with scheduler 111. Therefore, for brevity, only a single processing node will be discussed. Processing node 103 communicates with scheduler 111 to indicate availability of the processing node at any instant, a change in state of the processing node from unavailable to available, or the expected timing for the processing node to change from unavailable to available. As discussed with regard to FIG. 1B, communication of the state of the processing node may be via a local area network, a visual signal, or any other means to convey a change in state.

The communication between the processing nodes and the scheduler allows the present invention to determine whether a cleared trajectory is available through all processing nodes subsequent to (i.e., downstream of) the bottleneck processing node and either back to the queue or to exit the network. In order for scheduler 111 to make this determination, scheduler 111 obtains feedback from the processing nodes as to their availability status. As discussed above, the processing nodes provide feedback to the scheduler as to whether they are currently available or not, a change in status from unavailable to available, or a projected time frame in which they will become available. Utilizing this information, scheduler 111 can then determine whether all processing nodes required for processing a product in the queue are currently available for a trajectory of the product through the network, or when the processing nodes will become available for a trajectory.

Additionally, once scheduler 111 finds a cleared trajectory for a product, the processing nodes are reserved for the trajectory within scheduler 111. "Reserved for the trajectory" means that the scheduler reserves each processing node within the cleared trajectory for processing a particular product. In this manner each processing node will be reserved for processing the selected product once the trajectory is initiated. It is not necessary that scheduler 111 communicate directly with each processing node to provide an reserved indication.

As briefly discussed above, the trajectory may be immediate or reserved in time. As such, if scheduler 111 determines that a cleared trajectory is available, and that the trajectory may be immediately initiated (e.g. the lithography node is not busy processing another product), then the trajectory is started. If however, scheduler 111 finds a cleared trajectory but the trajectory cannot be immediately initiated because, for example, one of the nodes is currently processing another product, then the trajectory may be reserved in time. "Reserved in time" means that the trajectory may be reserved to be initiated some time in the future when a currently unavailable node becomes available.

FIG. 3 also depicts communication between scheduler 111 and process control system 112. As discussed with regard to FIG. 1A, one function of process control system 112 is to control the flow of product through the network from one processing node to another. As such, once scheduler 111 has found a cleared trajectory and reserved the processing nodes, and it later becomes time to initiate the trajectory, scheduler 111 provides directions to process control system 112 to initiate the trajectory whereby process control system 112 controls the movement and processing of product through the network.

Figure 4:
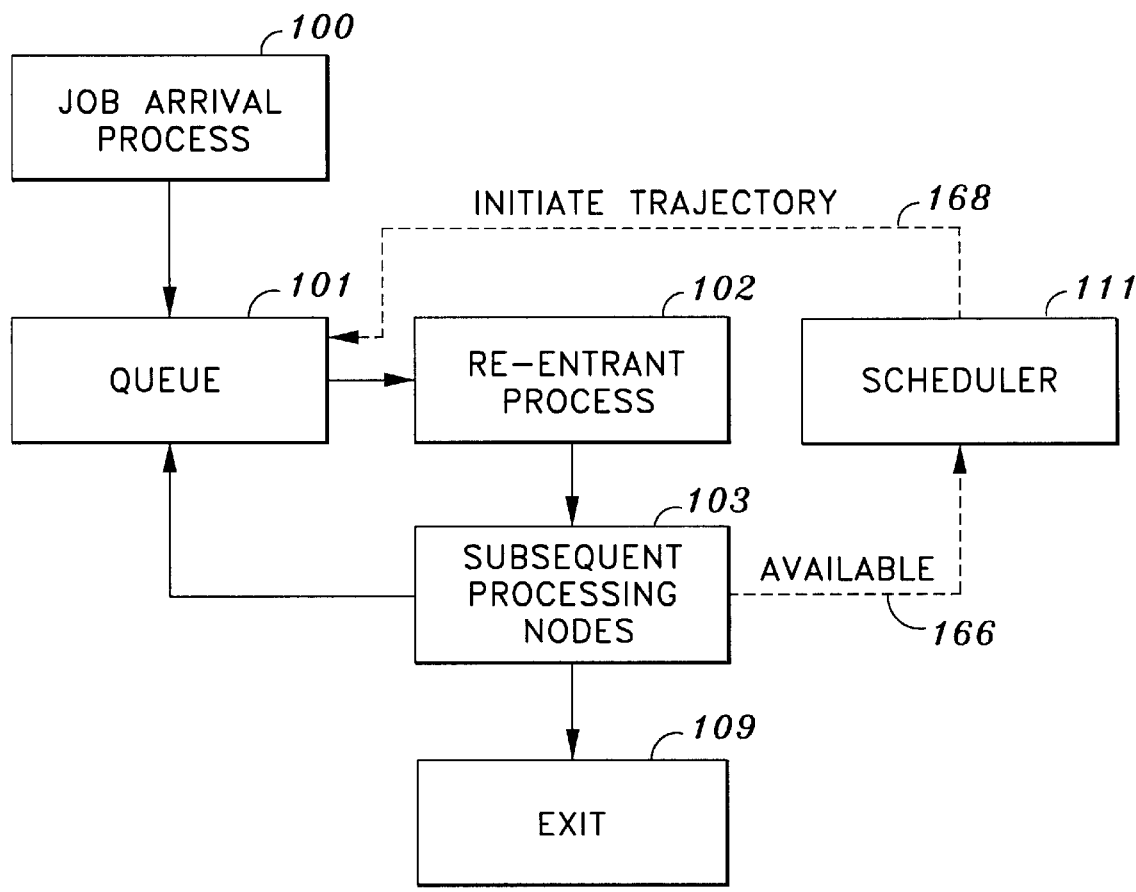
FIG. 4 illustrates product flow and communication between processing nodes according to the invention.

FIG. 4 depicts an example of communication and product flow between various portions of a processing network according to the invention. In FIG. 4, solid connecting lines indicate product flow, whereas dashed connecting lines indicate communication. Product is initially contained in job arrival process 100 and as discussed with regard to FIG. 1A, flows to queue 101 where it is held until a cleared trajectory is found. In this regard, scheduler 111 makes the cleared trajectory determination as discussed above with regard to FIG. 3. That is, the subsequent processing nodes 103 communicate with scheduler 111 to provide their availability status 166. Utilizing the processing nodes' status, if scheduler 111 finds a cleared trajectory for at least one of the product in the queue, scheduler 111 reserves the subsequent processing nodes for the trajectory. Then, when the trajectory is to be initiated, scheduler 111 provides a signal 168 to queue 101 to initiate the trajectory. However, if the trajectory cannot immediately be initiated, for instance because the cleared trajectory is based on future availability of the processing nodes, then scheduler 111 sends signal 168 to queue 101 when the time for initiation arrives.

Once the trajectory has been initiated, the product flows from queue 101 to re-entrant process 102. Again, in a semiconductor production line, the re-entrant process may be a lithography process. When re-entrant process 102 has completed processing the product, the product then flows to each of the subsequent processing nodes 103 required for processing the product. In FIG. 4, subsequent processing nodes 103 is shown as a single process for simplicity. However, like the description of FIG. 2, subsequent processing nodes 103 may be multiple processes.

After being processed by subsequent processing nodes 103, the product flow depends on the trajectory determined for the product by scheduler 111. In this regard, in making a cleared trajectory determination, scheduler 111 determines whether the trajectory will be to return the product to the queue for additional processing or whether the product is complete. As previously discussed with regard to FIG. 3, the scheduler receives feedback from a WIP tracking mechanism to track the number of processing passes each product has completed. Utilizing this information, scheduler 111 can determine whether the current trajectory is the last pass through the network, i.e. whether the product will be complete after the pass, or whether the product requires additional processing. In a case where scheduler 111 determines that the trajectory is the last pass, after being processed by subsequent processing nodes 103, the product flows to exit process 109. However, in a case where scheduler 111 determines that the trajectory is not the last pass and that the product requires additional processing, the product returns to queue 101 after being processed by subsequent processing nodes 103.

Figure 5:
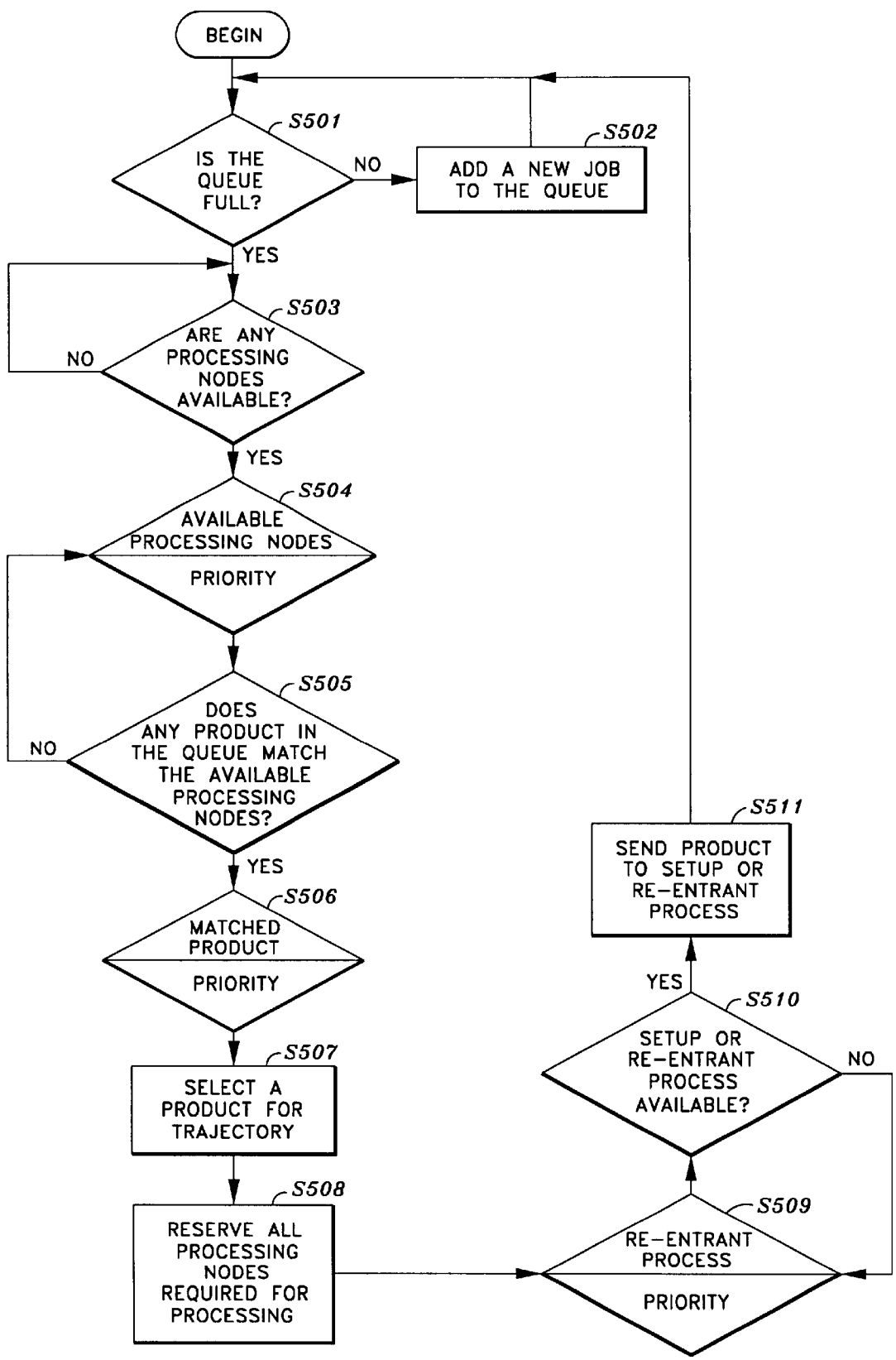
FIG. 5 is a flowchart depicting process steps according to the invention.

FIG. 5 is a flowchart depicting process steps for controlling a production line according to the invention. The process steps of FIG. 5 may be embodied as a computer program, or electronic device, or any other means that enables the process steps to operate. Preferably, the process steps stored on a computer-readable medium from which a computer, such as scheduler 111 of FIG. 1A, can read and execute them.

Briefly, the process steps perform a cleared trajectory determination, reserve processing nodes for the cleared trajectory, and initiate the trajectory.

The process begins by loading product into a queue of a re-entrant process. As seen in FIG. 5, at step S501 a determination is made whether the queue is full. The determination may be performed by considering a property of the queue, such as the instantaneous size, i.e. the number of product in the queue, in relation to a fixed limit of the number of product that can be present in the queue at any time. For example, the queue is assigned a fixed limit based on the maximum number of product it can hold. The process determines how many product are in the queue and compares it to the fixed limit. In the case that a determination is made that the queue is full, flow proceeds to step S503. However, in the case that a determination is made that the queue is not full, then a new product is added to the queue in step S502. New product is added to the queue until the queue size exceeds the fixed limit, at which time trajectory calculations are performed for the product in the queue as will now be described in more detail.

The trajectory calculations may involve several steps, including steps S503 through S505. As seen in FIG. 5, in step S503, a determination is made whether any of the processing nodes are available. This determination may be made in a variety of ways. For instance, a repeated polling loop may be performed by the scheduler to determine whether each of the processing nodes are available. Alternatively, as previously discussed with regard to FIGS. 3 and 4, each of the processing nodes may provide feedback to the scheduler on a periodic basis regarding their availability status. Regardless of the method used to indicate availability, if the processing nodes are not available, the determination process continues until at least one processing node becomes available.

Once at least one processing node becomes available, then each of the processing nodes that are available are sorted based on their priority within the processing network (step S504). For example, the processing nodes may be sorted based on which nodes are required for processing prior to any other nodes. For instance, processing nodes 103 and 104 of FIG. 1C may both be available. In the processing network, a product that requires processing by processing node 104 may first need to be processed by processing node 103. Therefore, processing node 103 is given a higher priority than processing node 104 since it needs to be used first. As each processing node becomes available, or provides an indication as to when it will become available, the scheduler sorts them based on their priority in the processing network.

After the available processing nodes are sorted, a determination is made whether any of the product contained in the queue matches the available processing nodes (step S505). That is, a determination is made whether any of the product in the queue require the available processing nodes for processing in their next pass through the network. For example, processing nodes 103 and 104 may be available. If any of the product contained in the queue requires processing only by processing nodes 103 and/or 104 in their next pass through the network, a match will be found. However, if processing nodes 103 and 104 are available, but each product in the queue requires processing by processing nodes 103, 104 and 106 in their next pass through the network, a match will not be found since processing node 106 is not available. Recall that the present invention finds a cleared trajectory through all processing nodes required for processing a selected product in a next pass through the network, including the re-entrant processing node. Therefore, if each and every processing node required for processing a selected product are not available, no match will be found. In a case that a match is found, then flow proceeds to step S506. However, if a match is not found, then another polling loop is performed to repeat sorting the available processing nodes based on priority, including any processing nodes which may have become available since the previous polling loop. Again, a determination is made in step S505 to match the available processing nodes with the product in the queue. The polling loop continues until a match is found, at which point flow proceeds to step S506.

In step S506, once at least one match is found, the product in the queue for which a match has been found are sorted based on their priority. That is, if more than one match is found, the scheduler assigns a priority to each of the product for which a match was found. The priority may be based on which product is closest to being completed, i.e. which product is closest to exiting the network. The product having the highest priority is then selected for a trajectory (S507) through each of the processing nodes required for processing that product in the next pass and either returning to the queue or exiting the network.

After a product has been selected for a trajectory in step S507, the processing nodes required for processing the selected product are reserved for the trajectory in step S508. The scheduler reserves each of the processing nodes for the trajectory of the selected product within itself. The processing nodes may be reserved for an immediate trajectory, or for a trajectory reserved in time. Whether a trajectory may be immediate or reserved in time depends on whether the processing equipment is immediately available for initiating the trajectory or if it will become available for the trajectory at some time (t) in the future.

Next, the re-entrant processing nodes are prioritized in step S509. The re-entrant processing nodes may be prioritized, for example, based on a desired result. For instance, more than one lithography machine may be contained in a network with each machine being primarily designated for processing a particular layer of a wafer. Therefore, it is desirable to assign priority to the machine that would produce the best result. However, the machine with the highest priority may not always be selected. For instance, if the desired machine is not available, any other machine may perform the process, but with a less desirable result.

In step S510, a determination is made whether a setup process for any of the re-entrant processing nodes or the re-entrant processing node itself are available. If either the setup process or the re-entrant process of any re-entrant node are available, then the trajectory of the selected product is initiated in step S511. If no setup process or a re-entrant process are available, then another polling loop is performed.

Once the trajectory of a selected product is initiated in step S511, the process returns to step S501 to again determine the number of product in the queue.

A description will now be given of control over a particular product in accordance with the trajectory illustrated in FIG. 1C.

In connection with this description, it is assumed that all of the wafers in the queue are awaiting a first processing pass, i.e. the product has not been processed before. In addition, it is assumed that on both a first pass and a second pass through the network, each wafer is to be processed by processing nodes 103, 104, 106 and 108 respectively.

When beginning the processing, initially, batches of wafers contained in cassettes are loaded into job arrival process 100. For example, as shown in FIG. 2, cassettes 125 through 130 may be loaded into job arrival process 100. The wafer batches are generally manually loaded by an operator.

Reverting to FIG. 1C, and utilizing the steps S501 and S502 of FIG. 5, WIP buffer (queue) 101 is loaded with wafer batches from job arrival process 100 until the number of wafers loaded into the queue reaches a predetermined limit, for example ten batches. The loading process may be controlled by process control center 112. Once the number of loaded wafer batches reaches the limit (ten), process control center 112 commands job arrival process 100 to stop loading wafer batches into queue 101.

Scheduler 111 determines whether there is a cleared trajectory through all processing nodes and either back to queue 101 or to exit process 109 for each of the ten wafer batches in queue 101. As previously discussed, scheduler 111 receives feedback from each of processing nodes 103 through 108 as to their availability status. In the present example, it will be assumed that none of the processing nodes are in use and therefore all processing nodes are available. Accordingly, no wafers are in the network except for those in queue 101. Therefore, since each wafer in queue 101 is awaiting a first processing pass through the network, for each wafer scheduler 111 determines whether processing nodes 103, 104, 106 and 108 are available. Recall that processing nodes 103, 104, 106 and 108 are the nodes required for processing a wafer on the first pass. Upon determining that the processing nodes are available, scheduler 111 determines that a cleared trajectory is available for each of the wafers in queue 101.

The next step in the processing is for scheduler 111 to determine which of the wafers in queue 101 is to be selected for a cleared trajectory. Recall from the discussion of FIG. 5 that the wafers are given a priority based on the number of processing steps required to complete processing. However, in the present example, all of the wafers have the same priority since they are all awaiting a first processing pass. Therefore, scheduler 111 will select any one of the ten wafers for processing, possibly by selecting the first wafer loaded into queue 101 from job arrival process 100.

Once scheduler 111 has selected a wafer for the cleared trajectory, scheduler 111 reserves processing nodes 103, 104, 106 and 108 (the processing nodes required for processing the selected wafer in the current, first, pass through the network). Once the processing nodes are reserved, scheduler 111 determines whether bottleneck processing node 102 is available for immediate trajectory. In the present example, no wafers are currently being processed by bottleneck process 102 and therefore an immediate trajectory is available. Accordingly, scheduler 111 sends a signal to queue 101 and to process control center 112 to release the selected wafer and to send it to bottleneck processing node 102 (lithography).

Process control center 112 then begins controlling the processing by operating queue 101, conveyors 114, gates 115, etc. to move the selected wafer to processing node 102.

Before entering processing node 102, the wafer may pass through tracking mechanism 113. Tracking mechanism 113 may be a scanning device that scans a bar code of the wafer, thus obtaining a serial number of the wafer. Tracking mechanism 113 then passes the wafer identification information on to scheduler 111. As previously discussed, scheduler 111 utilizes this information to assign a priority for each wafer in the queue.

As previously discussed, bottleneck node 102 may require manual setup by an operator. However, for the present example, it will be assumed that the setup is automatic and that upon reaching processing node 102, the wafer is automatically setup and the lithography process begins.

After the first wafer has begun processing, scheduler 111 then calculates the cleared trajectory determination for each of the wafers remaining in queue 101. In this case, since processing nodes 103, 104, 106 and 108 have been reserved, scheduler 111 may determine that they are unavailable and therefore scheduler 111 will not find a cleared trajectory for any of the product in the queue.

However, each of processing nodes 103, 104, 106 and 108 may provide an indication to scheduler 111 that they will become available in a time (t). As such, scheduler 111 may then find a cleared trajectory at the time (t) for each wafer in queue 101. In this case the cleared trajectory will be reserved in time. That is, scheduler 111 will send a reserve signal to each of the processing nodes for the second wafer selected for trajectory such that each of the processing nodes will be reserved for the trajectory of the second wafer at the time (t). Accordingly, upon reaching the time (t), scheduler 111 sends a signal to queue 101 to initiate the trajectory of the second wafer when processing node 102 becomes available.

The process continues with scheduler 111 calculating the cleared trajectory determination for each wafer in the queue. However, as the first wafer returns to the queue following completion of its first processing pass, scheduler 111 again calculates the cleared trajectory determination for the wafers in the queue, including the first wafer. This situation will now be described in more detail.

Once the first wafer has returned to queue 101, scheduler 111 calculates a cleared trajectory determination in the same manner as described above. However, if a cleared trajectory is found for more than one wafer in queue 101, scheduler 111 reserves the trajectory for the wafer with the highest priority. In the present case, the first wafer has completed one processing pass while all of the rest of the wafers in queue 101 have not been processed at all. Therefore, scheduler 111 assigns a higher priority to the first wafer and as a result, reserves the cleared trajectory for the first wafer before reserving a cleared trajectory for any of the lower priority wafers. Therefore, when processing node 102 becomes available, scheduler 111 sends a signal to queue 101 to initiate the trajectory for the first wafer.

As can readily be seen from the foregoing example, the scheduler communicates with the various processing equipment in network 124 and as a result, controls the flow of product in the processing facility. Ordinarily, none of the product in the queue begins to be processed until a cleared trajectory determination is found and the processing nodes have been reserved for the trajectory; because of this, secondary bottlenecks in the processing network are largely avoided. Additionally, the utilization of the bottleneck process is greatly enhanced since a more optimum loading schedule is provided for by the scheduler.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for controlling a production line which queues WIP (Work In Process) prior to a re-entrant bottleneck processing node, the method comprising the steps of:
   determining whether a cleared trajectory is available for a selected one of the WIP through all processing nodes downstream of the re-entrant bottleneck processing node for which processing by the downstream processing nodes is required for the selected one of the WIP in a next pass of the WIP through the production line; and
   in a case that the determining step determines that a cleared trajectory is available, reserving each of the downstream processing nodes for processing of the selected one of the WIP, the reserving step holding each of the downstream processing nodes as being available for processing the selected one of the WIP in the cleared trajectory and not being available for non-selected ones of the WIP.

2. A method according to claim 1, wherein the re-entrant bottleneck processing node is a photolithography processing node.

3. A method according to claim 1 further comprising the step of initiating the cleared trajectory for the selected one of the WIP after the downstream processing nodes have been reserved.

4. A method according to claim 1, wherein the cleared trajectory determination includes a trajectory back to the re-entrant bottleneck processing node or to an exit of the production line.

5. A method according to claim 1, wherein the determining steps determines that multiple WIP's have a cleared trajectory.

6. A method according to claim 5 further comprising the step of initiating the cleared trajectory for the selected one of the WIP from among the multiple WIP's after the downstream processing nodes have been reserved,
   wherein the WIP selected for the cleared trajectory is selected from among the multiple WIP's based on a queuing discipline.

7. A method according to claim 6, wherein the queuing discipline is a priority of jobs in a queue.

8. An apparatus for controlling a production line which queues WIP (Work In Process) prior to a re-entrant bottleneck processing node, comprising:
   a memory including a region for storing executable process steps; and
   a processor for executing the executable process steps;
   wherein the executable process steps include: (a) determining whether a cleared trajectory is available for a selected one of the WIP through all processing nodes downstream of the re-entrant bottleneck processing node for which processing by the downstream processing nodes is required for the selected one of the WIP in a next pass of the WIP through the production line; and (b) in the case that the determining step determines that a cleared trajectory is available, reserving each of the downstream processing nodes for processing of the selected one of the WIP, the reserving step holding each of the downstream processing nodes as being available for processing the selected one of the WIP in the cleared trajectory and not being available for non-selected ones of the WIP.

9. An apparatus according to claim 8, wherein the re-entrant bottleneck processing node is a photolithography processing node.

10. An apparatus according to claim 8 further comprising the step of initiating the cleared trajectory for the selected one of the WIP after the downstream processing nodes have been reserved.

11. An apparatus according to claim 8, wherein the cleared trajectory determination includes a trajectory back to the re-entrant bottleneck processing node or to an exit of the production line.

12. An apparatus according to claim 8, wherein the determining step determines that multiple WIP's have a cleared trajectory.

13. An apparatus according to claim 12 further comprising the step of initiating the cleared trajectory for the selected one of the WIP from among the multiple WIP's after the downstream processing nodes have been reserved,
   wherein the WIP selected for the cleared trajectory is selected from among the multiple WIP's based on a queuing discipline.

14. An apparatus according to claim 13, wherein the queuing discipline is a priority of jobs in a queue.

15. Computer-executable process steps for controlling a production line that queues WIP (Work In Process) prior to a re-entrant bottleneck processing node, the computer-executable process steps comprising:
   a step of determining whether a cleared trajectory is available for a selected one of the WIP through all processing nodes downstream of the re-entrant bottleneck processing node for which processing by the downstream processing nodes is required for the selected one of the WIP in a next pass of the WIP through the production line; and a step of, in a case that the determining step determines that a cleared trajectory is available, reserving each of the downstream processing nodes for processing of the selected one of the WIP, the reserving step holding each of the downstream processing nodes as being available for processing the selected one of the WIP in the cleared trajectory and not being available for non-selected ones of the WIP.

16. Computer-executable process steps according to claim 15, wherein the re-entrant bottleneck processing node is a photolithography processing node.

17. Computer-executable process steps according to claim 15 further comprising the step of initiating the cleared trajectory for the selected one of the WIP after the downstream processing nodes have been reserved.

18. Computer-executable process steps according to claim 15, wherein the cleared trajectory determination includes a trajectory back to the re-entrant bottleneck processing node or to an exit of the production line.

19. Computer-executable process steps according to claim 15 wherein the determining step determines that multiple WIP's have a cleared trajectory.

20. Computer-executable process steps according to claim 19 further comprising the step of initiating the cleared trajectory for the selected one of the WIP from among the multiple WIP's after the downstream processing nodes have been reserved,
   wherein the WIP selected for the cleared trajectory is selected from among the multiple WIP's based on a queuing discipline.

21. Computer-executable process steps according to claim 20, wherein the queuing discipline is a priority of jobs in a queue.

22. A computer-readable medium on which is stored code for performing computer-executable process steps for controlling a production line that queues WIP (Work In Process) prior to a re-entrant bottleneck processing node, comprising:
   code for a determining step of determining that a cleared trajectory is available for a selected one of the WIP through all processing nodes downstream of the re-entrant bottleneck processing node for which processing by the downstream processing nodes is required for the selected one of the WIP in a next pass of the WIP through the production line; and
   code for a reserving step of, in a case where the determining step determines that a cleared trajectory is available, reserving each of the downstream processing nodes for processing of the selected one of the WIP, the reserving step holding each of the downstream processing nodes as being available for processing the selected one of the WIP in the cleared trajectory and not being available for processing non-selected ones of the WIP.

23. A computer-readable medium according to claim 22, wherein the re-entrant bottleneck processing node is a photolithography processing node.

24. A computer-readable medium according to claim 22 further comprising code for initiating the cleared trajectory for the selected one of the WIP after the downstream processing nodes have been reserved.

25. A computer-readable medium according to claim 22, wherein the cleared trajectory determination includes a trajectory back to the re-entrant bottleneck processing node or to an exit of the production line.

26. A computer-readable medium according to claim 22, wherein the determining step determines that multiple WIP's have a cleared trajectory.

27. A computer-readable medium according to claim 26 further comprising code for initiating the cleared trajectory for the selected one of the WIP from among the multiple WIP's after the downstream processing nodes have been reserved,
   wherein the WIP selected for the cleared trajectory is selected from among the multiple WIP's based on a queuing discipline.

28. A computer-readable medium according to claim 27, wherein the queuing discipline is a priority of jobs in a queue.

29. A method according to claim 1, wherein the cleared trajectory may be instantaneous or reserved in time.

30. An apparatus according to claim 8, wherein the cleared trajectory may be instantaneous or reserved in time.

31. Computer-executable process steps according to claim 15, wherein the cleared trajectory may be instantaneous or reserved in time.

32. A computer-readable medium according to claim 22, wherein the cleared trajectory may be instantaneous or reserved in time.

* * * * *

UNITED STATES PATENT AND TRADEMARK OFFICE
CERTIFICATE OF CORRECTION

PATENT NO. : 6,714,830 B2
DATED : March 30, 2004
INVENTOR(S) : Browning

It is certified that error appears in the above-identified patent and that said Letters Patent is hereby corrected as shown below:

Column 3,
Line 41, "Where" should read -- where --.

Column 4,
Line 11, "built in" should read -- built-in --.

Column 7,
Lines 47, 49 and 53, "setup" should read -- set up --.

Column 8,
Line 27, "for" should be deleted.

Column 9,
Line 15, "pass" should read -- passes --.

Column 10,
Line 43, "an" should read -- a --.

Column 11,
Line 25, "is" should read -- are --.

Column 14,
Line 51, "setup" should read -- set up --.

Column 16,
Line 4, "steps" should read -- step --.

Signed and Sealed this

Twenty-third Day of November, 2004

JON W. DUDAS
*Director of the United States Patent and Trademark Office*